United States Patent
Fowe (10) Patent No.: US 11,657,706 B2
(45) Date of Patent: May 23, 2023

(54) METHOD AND APPARATUS FOR IDENTIFYING A LANE LEVEL TRAFFIC SURPRISE

(71) Applicant: HERE GLOBAL B.V., Eindhoven (NL)

(72) Inventor: James Fowe, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/577,564

(22) Filed: Sep. 20, 2019

(65) Prior Publication Data

US 2021/0090434 A1    Mar. 25, 2021

(51) Int. Cl.
  *G08G 1/01*    (2006.01)
  *G08G 1/052*    (2006.01)

(52) U.S. Cl.
  CPC .......... *G08G 1/0129* (2013.01); *G08G 1/052* (2013.01)

(58) Field of Classification Search
  CPC ... G08G 1/0129; G08G 1/052; G01C 21/3691
  See application file for complete search history.

(56) References Cited

U.S. PATENT DOCUMENTS

| | | | |
|---|---|---|---|
| 9,251,703 B1* | 2/2016 | Mbekeani | G08G 1/09675 |
| 2007/0208497 A1* | 9/2007 | Downs | G08G 1/0104 |
| | | | 701/117 |
| 2008/0071465 A1 | 3/2008 | Chapman et al. | |
| 2011/0161261 A1* | 6/2011 | Wu | G08G 1/0104 |
| | | | 706/12 |
| 2016/0153804 A1* | 6/2016 | Fowe | G08G 1/0141 |
| | | | 701/118 |
| 2017/0004705 A1* | 1/2017 | Fowe | G01C 21/3658 |
| 2017/0084178 A1 | 3/2017 | Jain et al. | |
| 2017/0146353 A1* | 5/2017 | Kroeller | G08G 1/012 |
| 2017/0352262 A1 | 12/2017 | Xu et al. | |
| 2018/0033300 A1 | 2/2018 | Hanson | |
| 2019/0025837 A1 | 1/2019 | Conor et al. | |

(Continued)

OTHER PUBLICATIONS

Extended European Search Report for European Application No. 20197272.6 dated Feb. 18, 2021, 8 pages.

(Continued)

*Primary Examiner* — Hongmin Fan
(74) *Attorney, Agent, or Firm* — Alston & Bird LLP (57) ABSTRACT

A method, apparatus and computer program product are provided to identify a lane level traffic surprise. In the context of a method, historical lane level traffic information is received including a representation of a speed of travel along a respective lane of a link. The method also receives recent lane level traffic information including a representation of a speed of travel along the respective lane of the link. The recent lane level traffic information is indicative of more recent traffic conditions, than the traffic conditions represented by at least some of the historical lane level traffic information. The method further includes determining a representation of a difference between representations of the speed of travel provided by the historical lane level traffic information and the recent lane level traffic information, and identifying the lane level traffic surprise based upon representation of the difference.

21 Claims, 3 Drawing Sheets

(56) References Cited

U.S. PATENT DOCUMENTS

2020/0158530 A1* 5/2020 Xu .................. G08G 1/0116

OTHER PUBLICATIONS

Lee, J.W. et al., *Development of Lane-Level Guidance Service in Vehicle Augmented Reality System*, 2015 17th International Conference on Advanced Communication Technology (ICACT), IEEE (Jul. 2015) 263-266.

Smith, D. L. et al., *Feasibility of Modeling Land-Change Performance* [online][retrieved Dec. 2, 2019]. Retrieved via the Internet: https://pdfs.semanticscholar.org/c590/0d1cbd8441523cd62e605e6dfc96108f0cbe.pdf (dated 2003) 17 pages.

Lane Change [online] Retrieved via the Internet: https://www.youtube.com/watch?vU2yHjyavLoY&feature-youtu.be (Aug. 13, 2014) 1 page.

Office Action for European Application No. 20197272.6 dated Mar. 10, 2022, 7 pages.

Office Action for European Application No. 20197272.6 dated Dec. 22, 2022, 5 pages.

* cited by examiner

METHOD AND APPARATUS FOR IDENTIFYING A LANE LEVEL TRAFFIC SURPRISE

TECHNOLOGICAL FIELD

An example embodiment relates generally to the identification of a lane level traffic surprise and, more particularly, to the identification of a lane level traffic surprise based upon differences between historical and recent speeds of travel along a respective lane.

BACKGROUND

Traffic is typically recurrent with a similar traffic pattern occurring during the same periods of time for the various days of the week. During the weekdays in an urban environment, for example, certain roads may experience heavy traffic during the morning and evening rush hours, a moderate amount of traffic during the mid-day and a lighter flow of traffic in the evenings. However, on the weekend, a number of these same roads may experience much lighter traffic volumes throughout the day and the evening. Conversely, the roads in or around certain shopping areas in the suburbs may experience much greater traffic during the day on weekend days than during those same periods of time on a weekday. For traffic that is recurrent and predictable, drivers who are accustomed to driving along the same roads in much the same pattern know what to expect and are generally able to navigate relatively easily and safely, even in instances of heavy traffic since the drivers anticipate the presence of heavy traffic and drive accordingly.

In some instances, unexpected delays may occur at a link level, such as in an instance in which there is unexpectedly heavy traffic along all lanes of a road. In such a situation, a driver may be delayed and the estimated time of arrival may accordingly be increased, but typically such unexpected link level traffic congestion does not lead to safety concerns. However, in some instances, unexpected traffic conditions may exist specifically in one or more particular lanes of a link, but not in all of the lanes. Such unexpected lane level traffic conditions not only create issues with respect to the routing of a vehicle and cause delays, but may also create additional safety concerns since the driver is not anticipating the unexpected lane level traffic conditions and may, in some instances, endeavor to respond to the unexpected lane level traffic conditions by switching lanes in a manner with which the driver is unaccustomed and potentially very quickly without as much preparation.

Such lane level traffic conditions may be unexpected since personal navigation devices that provide lane—level guidance generally utilize maps that lack dynamic lane—level content, thereby not alerting a driver as to unexpected lane—level traffic conditions. Such unexpected lane level traffic conditions may be caused by a number of different traffic situations including another vehicle that has encountered mechanical problems and is blocking a lane, a traffic accident or the like. While lane level traffic delays may be caused by unexpected road repairs or construction or by organized events, unexpected lane level traffic conditions generally are not caused by construction or other events that are planned and that are advertised in advance as such events are typically known to drivers in advance such that drivers can adapt to the lane closures or other lane level traffic delays that are created by these events in a more systematic and safer manner.

BRIEF SUMMARY

A method, apparatus and computer program product are provided in accordance with an example embodiment in order to identify a lane level traffic surprise. By identifying a lane level traffic surprise, such as based upon differences between the historical and the recent speeds of travel along a respective lane of a link, action maybe taken to reduce the safety issues associated with the unexpected lane level traffic condition. For example, a driver or an autonomous vehicle may be alerted in advance such that the lane level traffic conditions are no longer unexpected but may be taken into account in advance, such as by appropriately repositioning the vehicle in a different lane for taking a different route. Additionally or alternatively, the lane level traffic surprise may be taken into account in conjunction with routing, both to more accurately predict the estimated time of arrival in light of the lane level traffic surprise, but also, in some instances, to suggest routes that will not encounter the lane level traffic surprise.

In an example embodiment, a method for identifying a lane level traffic surprise is provided. The method includes receiving historical lane level traffic information including a representation of a speed of travel along a respective lane of a link. The method also receives recent lane level traffic information including a representation of a speed of travel along the respective lane of the link. The recent lane level traffic information is indicative of more recent traffic conditions, than the traffic conditions represented by at least some of the historical lane level traffic information. The method further includes determining a representation of a difference between representations of the speed of travel provided by the historical lane level traffic information and the recent lane level traffic information, and identifying the lane level traffic surprise based upon representation of the difference.

The representation of the difference may be a difference in the speed of travel provided by the historical lane level traffic information and the recent lane level traffic information. In this example embodiment, the method identifies the lane level traffic surprise in an instance in which the difference of the speed of travel satisfies a predefined threshold. The method of this example embodiment may also identify the lane level traffic surprise as either a first type of lane level traffic surprise or a second type of lane level traffic surprise. The first type of lane level traffic surprise occurs in an instance in which the speed of travel along the respective lane provided by the historical lane level traffic information exceeds the speed of travel along the respective link provided by the recent lane level traffic information. Conversely, the second type of lane level traffic surprise occurs in an instance in which the speed of travel along the respective link provided by the historical lane level traffic information is less than the speed of travel along the respective link provided by the recent lane level traffic information. In an example embodiment, the representation of the difference comprises a difference in the speed of travel provided by the historical lane level traffic information and the recent lane level traffic information as a percentage of the speed of travel provided by the historical lane level traffic information.

The method of an example embodiment also includes causing a message to be provided to a driver or a vehicle indicative of the lane level traffic surprise. The method of an example embodiment also includes causing information to be published regarding the lane level traffic surprise. In an example embodiment, the method also causes provision of the representation of the difference between representations of the speed of travel provided by the historical lane level traffic information and the recent lane level traffic information for use as a routing cost by a routing algorithm. The method of an example embodiment determines a representation of a difference between representations of the speed of travel provided by the historical and recent lane level traffic information based on representations as speed of travel provided by the historical lane level traffic information and the recent lane level traffic information for the same time epoch.

In an example embodiment, an apparatus as provided for identifying a lane level traffic surprise. The apparatus includes at least one processor and at least one non-transitory memory including computer program code instructions with the computer program code instructions configured to, when executed by the at least one processor, cause the apparatus to receive historical lane level traffic information regarding a representation of a speed of travel along a respective lane of a link and also to receive recent lane level traffic information including a representation of a speed of travel along the respective lane of the link. The recent lane level traffic information is indicative of more recent traffic conditions than the traffic conditions represented by at least some of the historical lane level traffic information. The computer program code instructions are also configured to, when executed by the at least one processor, cause the apparatus to determine a representation of a difference between representations of the speed of travel provided by the historical lane level traffic information and the recent lane level traffic information. The computer program code instructions are further configured to, when executed by the at least one processor, cause the apparatus to identify the lane level traffic surprise based upon the representation of the difference.

The representation of the difference may be a difference in the speed of travel provided by the historical lane level traffic information and the recent lane level traffic information. In this example embodiment, the computer program code instructions configured to identify the lane level traffic surprise include computer program code instructions configured to identify the lane level traffic surprise in an instance in which the difference in the speed of travel satisfies a predefined threshold. In this example embodiment, the computer program code instructions configured to identify the lane level traffic surprise may also include computer program code instructions to identify the lane level traffic surprise as a first type of lane level traffic surprise or as a second type of lane level traffic surprise. The first type of lane level traffic surprise occurs in an instance in which a speed of travel along the respective link provided by the historical lane level traffic information exceeds the speed of traffic along the respective link provided by the recent lane level traffic information. Conversely, the second type of lane level traffic surprise occurs in an instance in which the speed of travel along the respective link provided by the historical lane level traffic information is less than the speed of travel along the respective link provided by the recent lane level traffic information. In an example embodiment, the representation of the difference comprises a difference in the speed of travel provided by the historical lane level traffic information and the recent lane level traffic information as a percentage of the speed of travel provided by the historical lane level traffic information.

The computer program code instructions of an example embodiment are further configured to, when executed by the at least one processor, cause the apparatus to cause a message to be provided to a driver or a vehicle indicative of the lane level traffic surprise. In another example embodiment, the computer program code instructions are further configured to, when executed by the at least one processor, cause the apparatus to cause information to be published regarding the lane level traffic surprise. The computer program code instructions are further configured to, when executed by the at least one processor, cause the apparatus of an example embodiment to cause provision of the representation of the difference between the representations of the speed of travel provided by the historical lane level traffic information and the recent lane level traffic information for use as a routing cost by routing algorithm. In an example embodiment, the computer program instructions are configured to determine the representation of the difference based on the representations of the speed of travel provided by the historical lane level traffic information and the recent lane level traffic information for the same time epoch.

In further example embodiment, a computer program product is provided for identifying a lane level traffic surprise. The computer program product includes at least one non-transitory computer-readable storage medium having computer-executable program code instructions stored therein with the computer-executable program code instructions configured to receive historical lane level traffic information including a representation of a speed of travel along a respective lane of a link and to receive recent lane level traffic information including a representation of a speed of travel along the respective lane of the link. The recent lane level traffic information is indicative of more recent traffic conditions than the traffic conditions represented by the historical lane level traffic information. The computer-executable program code instructions are also configured to determine a representation of a difference between representations of the speed of travel provided by the historical lane level traffic information and the recent lane level traffic information and to identify the lane level traffic surprise based upon the representation of the difference.

The representation of the difference may include a difference in the speed of travel provided by the recent lane level traffic information and the historical lane level traffic information. In this example embodiment, the computer-executable program code instructions configured to identify the lane level traffic surprise may include computer-executable program code instructions configured to identify the lane level traffic surprise in an instance in which the difference of the speed of travel satisfies a predefined threshold. In this example embodiment, the computer-executable program code instructions configured to identify the lane level traffic surprise may also include computer-executable program code instructions configured to identify the lane level traffic surprise as a first type of lane level traffic surprise or as a second type of lane level traffic surprise. The first type of lane level traffic surprise occurs in an instance in which the speed of travel along the respective lane provided by the historical lane level traffic information exceeds the speed of travel along the respective link provided by the recent lane level traffic information. Conversely, the second type of lane level traffic surprise occurs in an instance in which the speed of travel along the respective link provided by the historical lane level traffic information is less than the speed of travel along the respective link provided by the recent lane level traffic information. In an example embodiment, the representation of the difference comprises a difference in the speed of travel provided by the historical lane level traffic information and the recent lane level traffic information as a percentage of the speed of travel provided by the historical lane level traffic information.

The computer-executable program code instructions of an example embodiment also include computer-executable program code instructions configured to cause a message to be provided to a driver or a vehicle indicative of the lane level traffic surprise. Additionally or alternatively, the computer-executable program code instructions of an example embodiment may also include computer-executable program code instructions configured to cause information to be published regarding the lane level traffic surprise. In an example embodiment, the computer-executable program code instructions may also include computer-executable program code instructions configured to cause provision of the representation of the difference between representations of the speed of travel provided by the historical lane level traffic information and the recent lane level traffic information for use as a routing cost by a routing algorithm.

In yet another example embodiment, an apparatus for identifying a lane level traffic surprise is provided. The apparatus includes means for receiving historical lane level traffic information including a representation of a speed of travel along a respective lane of a link. The apparatus also includes means for receiving recent lane level traffic information including a representation of a speed of travel along the respective lane of the link. The recent lane level traffic information is indicative of more recent traffic conditions, than the traffic conditions represented by at least some of the historical lane level traffic information. The apparatus further includes means for determining a representation of a difference between representations of the speed of travel provided by the historical lane level traffic information and the recent lane level traffic information, and means for identifying the lane level traffic surprise based upon representation of the difference.

The representation of the difference may be a difference in the speed of travel provided by the historical lane level traffic information and the recent lane level traffic information. In this example embodiment, the apparatus for identifying the lane level traffic surprise includes means for identifying the lane level traffic surprise in an instance in which the difference of the speed of travel satisfies a predefined threshold. The means for identifying the lane level traffic surprise in accordance with this example embodiment may also include means for identifying the lane level traffic surprise as either a first type of lane level traffic surprise or a second type of lane level traffic surprise. The first type of lane level traffic surprise occurs in an instance in which the speed of travel along the respective lane provided by the historical lane level traffic information exceeds the speed of travel along the respective link provided by the recent lane level traffic information. Conversely, the second type of lane level traffic surprise occurs in an instance in which the speed of travel along the respective link provided by the historical lane level traffic information is less than the speed of travel along the respective link provided by the recent lane level traffic information. In an example embodiment, the representation of the difference comprises a difference in the speed of travel provided by the historical lane level traffic information and the recent lane level traffic information as a percentage of the speed of travel provided by the historical lane level traffic information.

The apparatus of an example embodiment also includes means for causing a message to be provided to a driver or a vehicle indicative of the lane level traffic surprise. The apparatus of an example embodiment also includes means for causing information to be published regarding the lane level traffic surprise. In an example embodiment, the apparatus additionally or alternatively includes means for providing the representation of the difference between representations of the speed of travel provided by the historical lane level traffic information and the recent lane level traffic information for use as a routing cost by a routing algorithm. The apparatus of an example embodiment includes means for determining a representation of a difference between representations of the speed of travel provided by the historical and recent lane level traffic information based on representations as speed of travel provided by the historical lane level traffic information and the recent lane level traffic information for the same time epoch.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to identify a lane level traffic surprise. The lane level traffic surprise represents a deviation, such as a meaningful deviation, in the behavior of traffic on respective lane of a link. This difference in behavior is typically represented by a difference in the speed of travel along the respective lane of a link. Additionally, the lane level traffic surprise is unexpected in that the lane level traffic surprise does not predictably occur, such as in the manner in which traffic regularly backs up and is slowed at certain onramps and offramps during rush hour on weekdays but not at other times of the day or days of the week, but is, instead, representative of traffic behavior within a respective lane of a link that does not typically or regularly occur. As a result of its unexpected nature, a lane level traffic surprise may disrupt the route taken by drivers and may not only alter the time required to traverse a respective route and correspondingly change the estimated time of arrival, but may, in some instances, cause vehicles to change their behavior, such as by changing lanes, in a manner that is unplanned or at least less planned and, as a result, may create more dangerous driving conditions than in the absence of the lane level traffic surprise.

Figure 1:
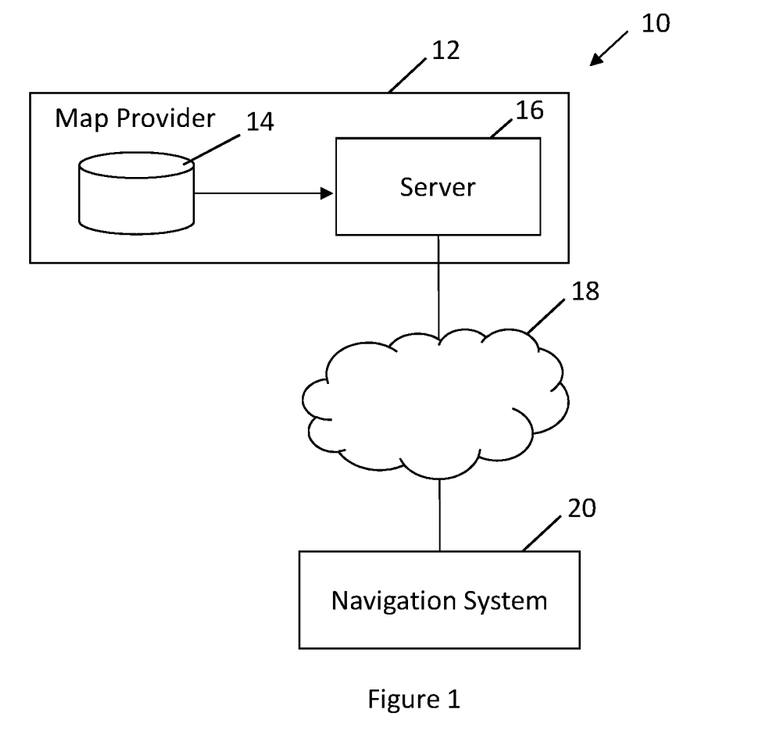
FIG. 1 is a block diagram of a system for maintaining historical lane level traffic information and for identifying a lane level traffic surprise based upon differences between the historical lane level traffic information and more recent lane level traffic information in accordance with an example embodiment of the present disclosure.

The method, apparatus and computer program product configured to identify a lane level traffic surprise in accordance with an example embodiment of the present disclosure may be embodied in various manners including as a system, such as depicted in FIG. 1, for updating and providing a map and related map information to various navigation or other types of mapping systems. The system 10 of FIG. 1 includes a map provider 12. The map provider includes a database 14 that stores the information necessary to define a map of the roads and other features, at least in a certain region. In this regard, the database may contain map data that indicates attributes of the road segments. The database may also include map data indicative of sidewalks or other types of pedestrian segments, as well as open areas, such as grassy regions or plazas.

The database 14 of an example embodiment may include node data, road segment data or link data, point of interest (POI) data or the like in addition to traffic data as described below. The database may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the database may contain path segment and node data records or other data that may represent bicycle lanes, pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The database can include data about the POIs and their respective locations in the POI records. The database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The database 14 may be a master map database, such as a high definition (HD) map database, stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device. The navigation-related functions can correspond to vehicle navigation, pedestrian navigation, or other types of navigation.

In addition to the map data, the map provider 12 and, more particularly, the database 14 of the map provider stores historical traffic information, including, for example, historical lane level traffic information. Among other things, the historical lane level traffic information includes a representation of the speed of travel along a respective lane of a link, such as a segment of a road. The representation of the speed of travel along a respective lane of a link may be the average speed of travel along the respective link or some other representation of the speed of travel.

As the speed of travel along a respective lane of a link may vary over the course of time, the historical lane level traffic information may include historical lane level traffic information for each of a plurality of time epochs during a week. In this regard, a week may be divided into a plurality of time epochs, such as a plurality of fifteen minute segments, that in combination represent the entire week. In this example embodiment, the historical lane level traffic information may include a representation of the speed of travel along a respective lane of a link during each time epoch of a week. For example, the historical lane level traffic information may include the average speed of travel along a respective lane of a link between 7:45 a.m. and 8:00 a.m. on a Monday, the average speed of travel along the same respective lane of the link between 9:00 p.m. and 9:15 p.m. on a Saturday evening and the average speed of travel along the same respective lane of the link during every other time epoch of the week.

The map provider 12 also includes a server 16 in communication with and configured to access the database 14. The server may be configured in various manners including as any one or more computing devices. The server of this example embodiment is also in communication, typically via a network 18, such as a cellular network, with a consumer of map data. In the embodiment of FIG. 1, the consumer of map data is depicted as a navigation system 20. In this example embodiment, the navigation system may be a personal navigation device or other type of mobile terminal, such as a smartphone or a mobile telephone, having navigation functionality, or an Advanced Driver Assistance System (ADAS), a vehicular navigation system, an assisted driving device or any of a wide variety of computing devices configured to provide navigation services. However, the system may include other types of consumers of map data including mapping systems or the like that may, but do not necessarily, include navigation capabilities, but may, instead, present a map and/or related traffic information.

Figure 2:
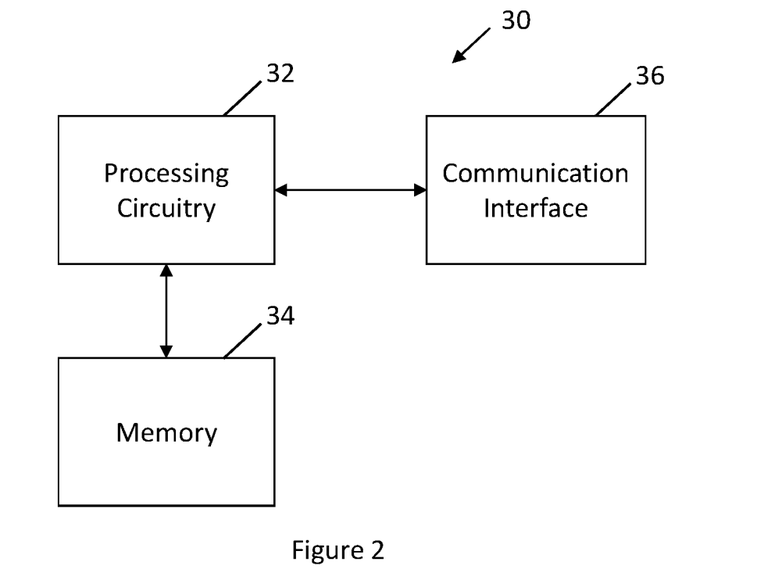
FIG. 2 is a block diagram of an apparatus specifically configured in order to identify a lane level traffic surprise in accordance with an example embodiment of the present disclosure.

In accordance with an example embodiment, an apparatus 30 is provided that is configured to identify a lane level traffic surprise. The apparatus may be embodied by any of a variety of computing devices. With respect to the system 10 of FIG. 1, the apparatus may be embodied by the server 16 or other computing device of the map provider 12. Alternatively, the apparatus may be embodied by another computing device, such as a computing device in communication with the map provider, such as a computing device associated with the network 18 or a computing device associated with a consumer of the map data, including a navigation system 20, a mapping system or the like. Regardless of the manner in which the apparatus is embodied, the apparatus of an example embodiment includes, is associated with or otherwise is in communication with processing circuitry 32, memory 34 and communication interface 36.

In some embodiments, the processing circuitry 32 (and/or co-processors or any other processors assisting or otherwise associated with the processing circuitry) may be in communication with the memory device 34 via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processing circuitry.

The processing circuitry 32 may be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processor may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 32 may be configured to execute instructions stored in the memory device 34 or otherwise accessible to the processing circuitry. Alternatively or additionally, the processing circuitry may be configured to execute hard coded functionality. As such, whether configured by hardware or software methods, or by a combination thereof, the processing circuitry may represent an entity (for example, physically embodied in circuitry) capable of performing operations according to an embodiment of the present invention while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of software instructions, the instructions may specifically configure the processing circuitry to perform the algorithms and/or operations described herein when the instructions are executed. However, in some cases, the processing circuitry may be a processor of a specific device (for example, a computing device) configured to employ an embodiment of the present invention by further configuration of the processor by instructions for performing the algorithms and/or operations described herein. The processing circuitry may include, among other things, a clock, an arithmetic logic unit (ALU) and logic gates configured to support operation of the processing circuitry.

The apparatus 30 of an example embodiment may also optionally include a communication interface 36 that may be any means such as a device or circuitry embodied in either hardware or a combination of hardware and software that is configured to receive and/or transmit data from/to other electronic devices in communication with the apparatus, such as a navigation system 20 or other consumer of map data. Additionally or alternatively, the communication interface may be configured to communicate in accordance with various wireless protocols including Global System for Mobile Communications (GSM), such as but not limited to Long Term Evolution (LTE). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s).

Figure 3:
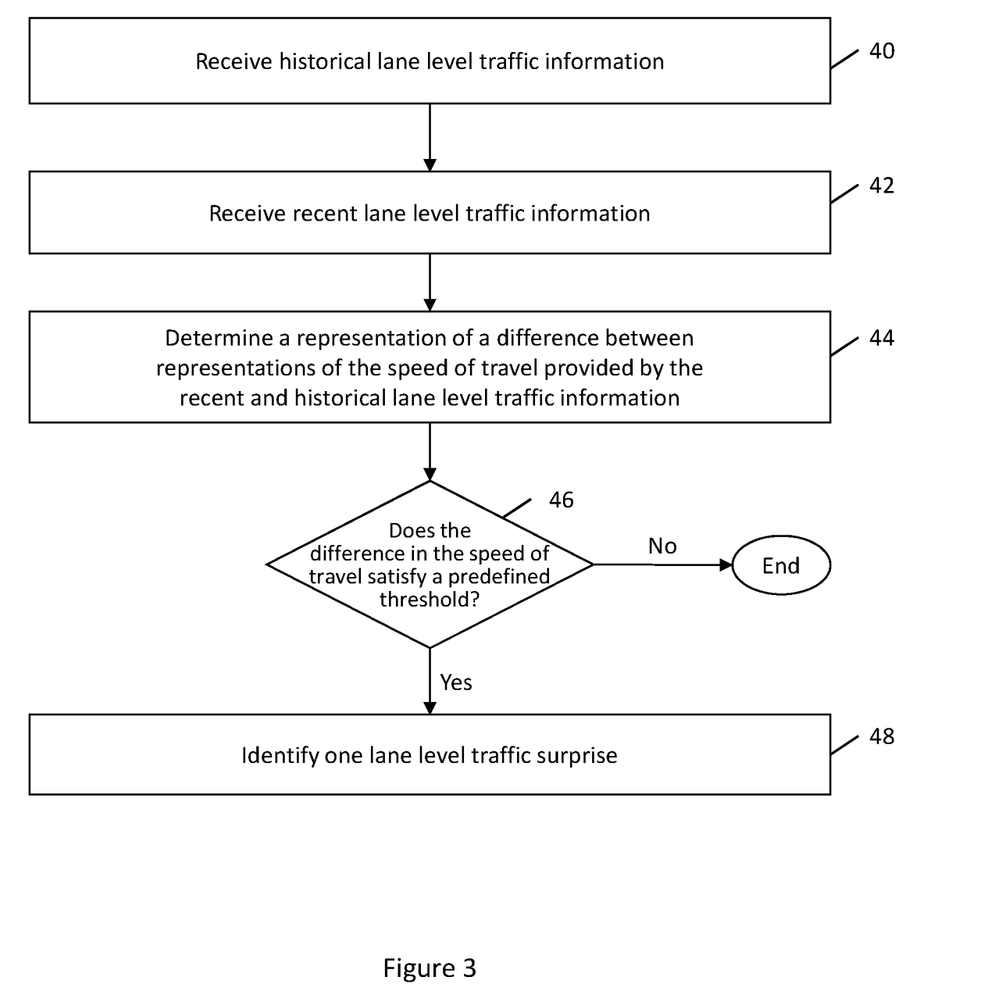
FIG. 3 is a flowchart illustrating the operations performed, such as by the apparatus of FIG. 2, in order to identify a lane level traffic surprise in accordance with an example embodiment to the present disclosure.

Referring now to FIG. 3, the operations performed, such as by the apparatus 30 of FIG. 2, in order to identify a lane level traffic surprise in accordance with an example embodiment to the present disclosure are depicted. As shown in block 40 of FIG. 3, the apparatus includes means, such as the processing circuitry 32, the communication interface 36 or the like, to receive historical lane level traffic information. The historical lane level traffic information includes a representation of the speed of travel along a respective lane of a link, e.g., a segment of a road. The speed of travel may be represented in various manners, including, for example, as an average speed of travel along the respective lane of the link. In an example embodiment, the historical lane level traffic information, such as the representation of the speed of travel along the respective lane of the link, is received for each of a plurality of time epochs during a week. The historical lane level traffic information may be received from a variety of sources, including one or more databases that store historical lane level traffic information. In the example embodiment of FIG. 1, however, the historical lane level traffic information is received from the database 14 of the map provider 12.

As shown in block 42 of FIG. 3, the apparatus 30 also includes means, such as the processing circuitry 32, the communication interface 36 or the like, for receiving recent lane level traffic information. The recent lane level traffic information includes a representation of the speed of travel along a respective lane of the link. Relative to the historical lane level traffic information, the recent lane level traffic information is also related to the same respective lane of the link for which historical lane level traffic information was received. The representation of the speed of travel along the respective lane of the link that is provided by the recent lane level traffic information may be provided in various manners, such as the average speed of travel during a respective time epoch with the time epoch defined in the same manner as the time epochs for which historical lane level traffic information is received.

The recent lane level traffic information is indicative of more recent traffic conditions than traffic conditions represented by at least some of the historical lane level traffic information. In this regard, the recent lane level traffic information of an example embodiment may represent real time or near real time lane level traffic information. In an example embodiment, the recent lane level traffic information is captured during the current time epoch and/or within a sliding time window that extends back from the current time over a predefined period of time, such as over a predefined period of time equal in length to a time epoch or some shorter period of time, e.g., 5 minutes. The recent lane level traffic information may be provided, for example, by one or more probes that are traveling or have recently traveled along the respective lane of the link. In this regard, a probe may be any device, such as a mobile device, e.g., a smartphone, a tablet computer, a personal digital assistant (PDA), a personal navigation device (PND), or the like, an in-vehicle navigation system, a vehicle control system, an ADAS or the like, that provides samples of probe data regarding, for example, the location of a vehicle as the vehicle proceeds along a road. The probe data may include not only the location of the vehicle as may be defined by a global positioning system (GPS) associated with the probe and the time at which the vehicle is at the location, but also the speed, the heading and other parameters that define the current behavior of the vehicle. Based upon the location, the probe data may be map matched to a lane of a link, such as by a lane level map matching technique. The probe data may also include an identifier, such as a trajectory identifier, that identifies the probe that provides the probe data and enables the linking of instances of probe data into vehicle trajectories and probe traces while still, in some embodiments, maintaining the anonymity of the probe device and/or a vehicle that the probe device is onboard. The recent lane level traffic information may also or alternatively be provided by other sources, such as products that publish traffic information at the lane level, such as products that published lane level traffic information in conjunction with split lane traffic and/or with high occupancy vehicle (HOV) lane traffic.

The recent lane level traffic information may be provided directly to the apparatus 30 or may be stored, such as in a database and also provided to the apparatus. In this example embodiment, the map provider 12 may receive the recent lane level traffic information and may store the recent lane level traffic information, such as within the database 14 so as to supplement the historical lane level traffic information with the recent lane level traffic information. The map provider of this example embodiment may also provide the recent lane level traffic information to the apparatus, such as may be embodied by the server 16. Although the recent lane level traffic information may be included within the historical lane level traffic information as a result of being stored with the database 14, the recent lane level traffic information is more recent than at least some of the other historical lane level traffic information and, as a result, permits a lane level traffic surprise to be identified.

The link for which historical lane level traffic information and recent lane level traffic information are received and evaluated may be any of a wide variety of links of a road system. However, in an example embodiment in a route has been defined, such as from an origin to a destination, the link for which historical lane level traffic information and recent lane level traffic information are received and evaluated is a link along the route, such as a link along the route that remains to be traversed by a vehicle.

As shown in block 44 of FIG. 3, the apparatus 30 also includes means, such as the processing circuitry 32 or the like, configured to determine the representation of a difference between representations of the speed of travel provided by the historical lane level traffic information and the recent lane level traffic information. The representation of the difference may depend upon the representations of the speed of travel. In an embodiment in which the representations of the speed of travel provided by the historical lane level traffic information and the recent lane level traffic information reflect the average speed of travel during a respective time epoch along a respective lane of a link, the representation of the difference that is determined by the apparatus, such as the processing circuitry, is the difference in average speed of travel along the respective lane of the link. In a further example embodiment, the apparatus, such as the processing circuitry, is configured to determine the representation of the difference during a time epoch as a percentage of the speed of travel, such as the average speed, provided by the historical lane level traffic information. In this regard, the representation of the difference during a time epoch may be determined to be the difference in average speed of travel along the respective lane of the link between average speed provided by the historical lane level traffic information and the average speed provided by the recent lane level traffic information divided by the average speed provided by the historical lane level traffic information. In other words, the representation of the difference Lane_Level_Avg_Speed for a particular lane of a link during a time epoch may be defined as follows:

Lane_Level_Avg_Speed(Link,Lane,Time)=[Historical_Avg_Speed(Link,Lane,Time)−Recent_Avg_Speed(Link,Lane,Time)]/Historical_Avg_Speed(Link,Lane,Time)

wherein Historical_Avg_Speed (Link, Lane, Time) and Recent_Avg_Speed (Link, Lane, Time) are the average speeds for the particular lane of the link during the time epoch provided by the historical lane level traffic information and the recent lane level traffic information, respectively.

Not only are the representations of the speed of travel provided by the historical lane level traffic information and the recent lane level traffic information for the same respective lane of a link, but the representations of the speed of travel provided by the historical lane level traffic information and the recent lane level traffic information are for the same time epoch. As a result of the recent lane level traffic information being more recent than historical lane level traffic information, the time epoch associated with the recent lane level traffic information may be for a more recent week, such as the current week, than the time epoch associated with the historical lane level traffic information which may be for the same time epoch from one or more prior weeks or for the same time epoch but with no association to a particular week so as to instead represent the general or average behavior for the time epoch. For example, both the recent lane level traffic information and historical lane level traffic information may be associated with the same time epoch, such as 8:00 a.m. to 8:15 a.m. on a Monday, but the time epoch for the recent lane level traffic information may be for the current Monday, while the historical lane level traffic information may be for Mondays of prior weeks.

As shown in decision block 46 of FIG. 3, the apparatus 30 includes means, such as the processing circuitry 32 or the like, to identify the lane level traffic surprise based upon the representation of the difference. Although the lane level traffic surprise may be identified in various manners, the apparatus of the illustrated embodiment includes means, such as the processing circuitry or the like, configured to determine whether the difference in the speed of travel of the historical lane level traffic information and the recent lane level traffic information satisfies a predefined threshold, such as by equaling or exceeding a predefined difference threshold.

In an instance in which the difference in the speed of travel between the historical lane level traffic information and the recent lane level traffic information satisfies the predefined threshold, the apparatus 30, such as the processing circuitry 32, may be configured to identify the lane level traffic surprise since the behavior of traffic as represented by the recent lane level traffic information differs, such as by an appreciable manner, from the historical lane level traffic information. Conversely, in an instance in which the difference in the speed of travel between the recent lane level traffic information and the historical lane level traffic information does not satisfy the predefined threshold, the apparatus, such as the processing circuitry, does not identify a lane level traffic surprise since the behavior of the traffic as represented by the recent lane level traffic information does not deviate, at least not appreciably, from the traffic behavior represented by the historical lane level traffic information. In this instance, the traffic behavior as represented by the recent lane level traffic information is not considered to be a surprise, but to be consistent with the normal or anticipated behavior of traffic along the respective lane of the link during the respective time epoch. Although FIG. 3 depicts the process ending in an instance in which the difference in the speed of travel fails to satisfy the predefined the predefined threshold, the process may be repeated regardless of whether the difference in the speed of travel satisfies the predefined threshold in order to identify other lanes along the link that are experiencing a lane level traffic surprise.

In an example embodiment, the apparatus 30, such as the processing circuitry 32, is also configured to determine the type of lane level traffic surprise. In an example embodiment, the apparatus includes means, such as the processing circuitry or the like, configured to identify the lane level traffic surprise as a first type of lane level traffic surprise in an instance in which the speed of travel along the respective link provided by the historical lane level traffic information exceeds the speed of travel along the respective link provided by the recent lane level traffic information. Alternatively, the apparatus of this example embodiment includes means, such as the processing circuitry or the like, configured to identify the lane level traffic surprise as a second type of lane level traffic surprise in an instance in which the speed of travel along the respective link provided by the historical lane level traffic information is less than the speed of travel along the respective link provided by the recent lane level traffic information. As such the apparatus, such as the processing circuitry, of this example embodiment is configured to distinguish between a first type of lane level traffic surprise in which traffic, as represented by the recent lane level traffic information, is slowed relative to the historical behavior during the same time epoch and a second type of lane level traffic surprise in which traffic, as represented by the recent lane level traffic information, is flowing more quickly along the respective link relative to the historical behavior during the same time epoch. In an instance in which a driver is endeavoring to reach a destination as soon as possible, the driver may be pleased by the second type of lane level traffic information and may proceed along the route including along the respective lane of the link since traffic is flowing more quickly than usual, but the driver may be displeased by the first type of lane level traffic surprise and may endeavor to change lanes or identify a different route to avoid the respective lane of the link along which traffic is moving slower than usual.

Figure 4:
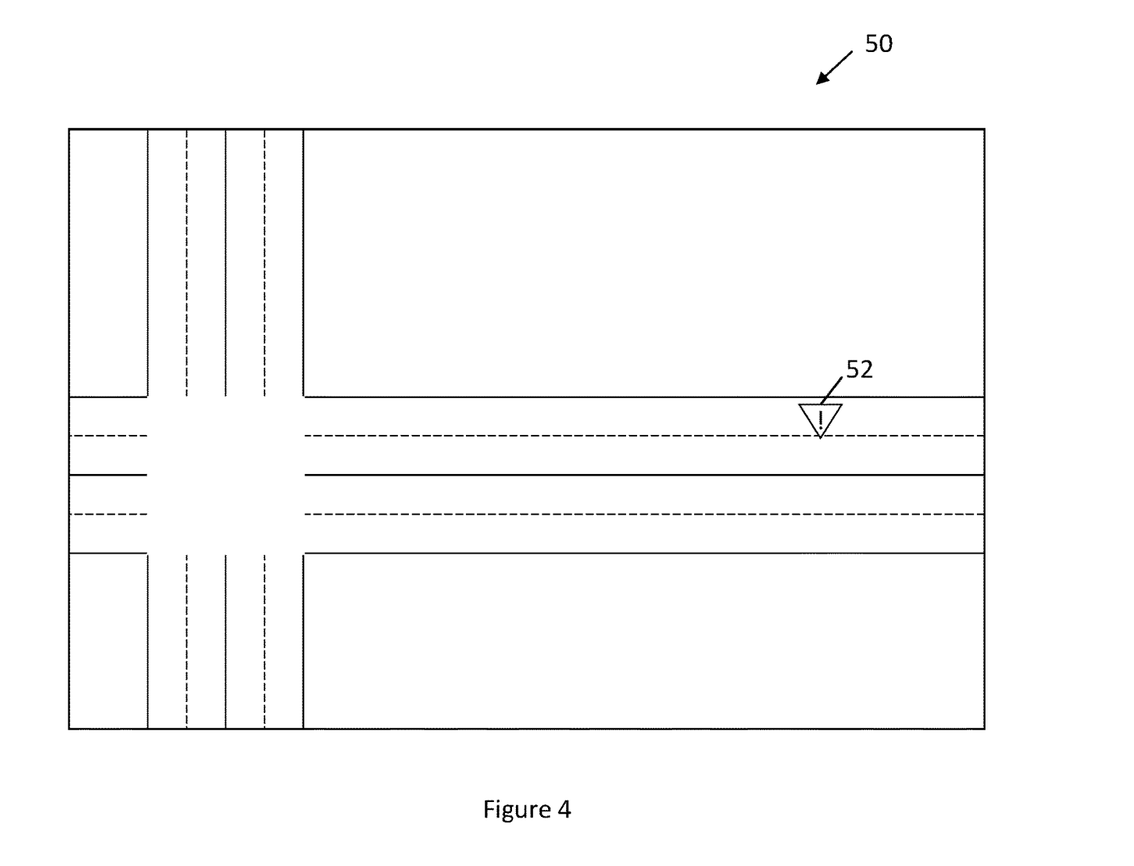
FIG. 4 is a representation of a portion of a map illustrating a message provided to a driver indicative of a lane level traffic surprise that has been identified in accordance with an example embodiment of the present disclosure.

In response to identifying the lane level traffic surprise, the apparatus 30 may be configured to perform various operations. In an example embodiment, the apparatus includes means, such as the processing circuitry 32, the communication interface 36 or the like, configured to cause a message to be provided to a driver or a vehicle indicative of the lane level traffic surprise. The message may be provided to the driver or the vehicle in various manners. In relation to a manually driven vehicle, the message may be provided audibly or visibly or in other manners, such as haptically. In the embodiment depicted in FIG. 4, the message is provided as an overlay upon a portion of a map 50 presented, such as by a navigation system 20 or mapping system to the driver. In the illustrated embodiment, the message is a warning to the driver is in the form of a triangle 52 having an exclamation point included therein. However, the message may be differently configured in other example embodiments. In an instance in which the vehicle is an autonomous or semi-autonomous vehicle, the message to the vehicle may identify the lane level traffic surprise such that the autonomous or semi-autonomous vehicle may take appropriate action in a preplanned manner, such as by changing lanes or altering the route in a safe manner.

Additionally or alternatively, the apparatus 30 of an example embodiment includes means, such as the processing circuitry 32, the communication interface 36 or the like, configured to cause information to be published regarding the lane level traffic surprise. The information may be in various forms, but may include the representation of speed of travel along the respective lane of the link as well as an indication of the link, the respective lane and the time epoch. Various subscribers may receive the information that is published regarding the lane level traffic surprise including, for example, departments of transportation of a city, county, state or other geographical or political region that may take the information regarding the lane level traffic surprise into account in conjunction with road design, road construction, signage or the like. Other consumers of the information published regarding the lane level traffic surprise may include law enforcement officials and other emergency responders who may be interested in the lane level traffic surprise as a result of the increased risk of incidents for at least certain types of lane level traffic surprises, as well as drivers or vehicles that may traverse the respective lane of the link.

In yet another example embodiment, the apparatus 30 may additionally or alternatively include means, such as the processing circuitry 32, the communication interface 36 or the like, configured to cause provision of the representation of the difference between representations of the speed of travel provided by the historical lane level traffic information and the recent lane level traffic information for use as a routing cost by a routing algorithm. In this regard, the apparatus may be configured to cause a representation of the difference to be provided to a navigation system such that the routing algorithm employed by the navigation system may take into account the difference in the speeds of travel represented by the historical lane level traffic information and the recent lane level traffic information in conjunction with defining a route from an origin to a destination and/or determining the length of time required to traverse the route including the estimated time of arrival at the destination. For example, in an instance in which the speed of travel provided by the recent lane level traffic information is much slower than the speed of travel provided by the historical lane level traffic information for the same lane of a link, the routing algorithm may identify a different route that does not include the link or at least does not include the respective lane of the link in order to avoid the traffic surprise and the safety issues created thereby. Alternatively, the routing algorithm may continue to define a route that includes the link and, in some instances, the respective lane of the link that is experiencing congestion, but may alter the estimated time of arrival to properly reflect delays that may be incurred as a result of the traffic surprise.

As described above, the method, apparatus 30 and computer program product of an example embodiment are configured to identify a lane level traffic surprise. By identifying the lane level traffic surprise, a vehicle, such as an autonomous vehicle, a semi-autonomous vehicle or a manually driven vehicle, that is approaching the link may be better prepared for the traffic surprise and, in some embodiments, may change lanes or may avoid the link altogether. By being advised of the lane level traffic surprise in advance, however, the vehicle may make such changes in a manner that is generally safer than reactionary lane changes made by a vehicle upon encountering and being surprised by a lane level traffic surprise. Additionally, routes may be defined and the time of travel including the estimated time of arrival may be more accurately defined by taking into account a traffic surprise that has been identified in a respective lane of a link, thereby improving the performance of navigation systems that rely upon such routing algorithms.

FIG. 3 illustrates a flowchart depicting a method according to an example embodiment of the present invention. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 34 of an apparatus employing an embodiment of the present invention and executed by the processing circuitry 32. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for identifying a lane level traffic surprise, the method comprising:

receiving historical lane level traffic information including a representation of a speed of travel along a respective lane of a link during each time epoch of a predefined time period;

receiving recent lane level traffic information including a representation of a speed of travel along the respective lane of the link during each time epoch of the predefined time period, wherein the recent lane level traffic information is indicative of more recent traffic conditions than traffic conditions represented by at least some of the historical lane level traffic information, wherein the recent lane level traffic information is based on probe data collected by one or more probes that are traveling within a current time epoch or have traveled within a sliding time window that extends back from a current time over a predefined period of time along the respective lane of the link, and wherein the probe data is associated with one or more respective identifiers that identify the one or more probes that provide the probe data and enable linking of instances of probe data into vehicle trajectories and probe traces while maintaining anonymity of one or more probe devices associated with the one or more probes that provide the probe data;

determining a representation of a difference between representations of the speed of travel provided by the historical lane level traffic information and the recent lane level traffic information for each of the time epochs; and identifying the lane level traffic surprise based upon the representation of the difference.

2. A method according to claim 1 wherein the representation of the difference comprises a difference in the speed of travel provided by the historical lane level traffic information and the recent lane level traffic information, and wherein identifying the lane level traffic surprise comprises identifying the lane level traffic surprise in an instance in which the difference in the speed of travel satisfies a predefined threshold.

3. A method according to claim 2 wherein identifying the lane level traffic surprise further comprises identifying the lane level traffic surprise as a first type of lane level traffic surprise in an instance in which the speed of travel along the respective link provided by the historical lane level traffic information exceeds the speed of travel along the respective link provided by the recent lane level traffic information or as a second type of lane level traffic surprise in an instance in which the speed of travel along the respective link provided by the historical lane level traffic information is less than the speed of travel along the respective link provided by the recent lane level traffic information.

4. A method according to claim 1 wherein the representation of the difference comprises a difference in the speed of travel provided by the historical lane level traffic information and the recent lane level traffic information as a percentage of the speed of travel provided by the historical lane level traffic information.

5. A method according to claim 1 further comprising causing a message to be provided to a driver or a vehicle indicative of the lane level traffic surprise.

6. A method according to claim 1 further comprising causing information to be published regarding the lane level traffic surprise.

7. A method according to claim 1 further comprising causing provision of the representation of the difference between representations of the speed of travel provided by the historical lane level traffic information and the recent lane level traffic information for use as a routing cost by a routing algorithm.

8. The method of claim 7 wherein the routing algorithm is a lane level routing algorithm.

9. A method according to claim 1 wherein identifying the lane level traffic surprise is further based upon the representation of the difference between the recent lane level traffic information and the historical lane level traffic information associated with respective time epochs that correspond to a same range of times during more recent and more distant periods of time, respectively, and wherein each time epoch of the predefined time period comprises a time of day and a day of the week.

10. A method according to claim 1 wherein the one or more respective identifiers that identify the one or more probes are trajectory identifiers.

11. An apparatus for identifying a lane level traffic surprise, the apparatus comprising at least one processor and at least one non-transitory memory including computer program code instructions, the computer program code instructions configured to, when executed by the at least one processor, cause the apparatus to:

receive historical lane level traffic information including a representation of a speed of travel along a respective lane of a link during each time epoch of a predefined time period;

receive recent lane level traffic information including a representation of a speed of travel along the respective lane of the link during each time epoch of the predefined time period, wherein the recent lane level traffic information is indicative of more recent traffic conditions than traffic conditions represented by at least some of the historical lane level traffic information, wherein the recent lane level traffic information is based on probe data collected by one or more probes that are traveling within a current time epoch or have traveled within a sliding time window that extends back from a current time over a predefined period of time along the respective lane of the link, and wherein the probe data is associated with one or more respective identifiers that identify the one or more probes that provide the probe data and enable linking of instances of probe data into vehicle trajectories and probe traces while maintaining anonymity of one or more probe devices associated with the one or more probes that provide the probe data;

determine a representation of a difference between representations of the speed of travel provided by the historical lane level traffic information and the recent lane level traffic information for each time epoch; and identify the lane level traffic surprise based upon the representation of the difference.

12. An apparatus according to claim 11 wherein the representation of the difference comprises a difference in the speed of travel provided by the historical lane level traffic information and the recent lane level traffic information, and wherein the computer program code instructions configured to identify the lane level traffic surprise comprise computer program code instructions configured to identify the lane level traffic surprise in an instance in which the difference in the speed of travel satisfies a predefined threshold.

13. An apparatus according to claim 12 wherein the computer program code instructions configured to identify the lane level traffic surprise further comprise computer program code instructions configured to identify the lane level traffic surprise as a first type of lane level traffic surprise in an instance in which the speed of travel along the respective link provided by the historical lane level traffic information exceeds the speed of travel along the respective link provided by the recent lane level traffic information or as a second type of lane level traffic surprise in an instance in which the speed of travel along the respective link provided by the historical lane level traffic information is less than the speed of travel along the respective link provided by the recent lane level traffic information.

14. An apparatus according to claim 11 wherein the representation of the difference comprises a difference in the speed of travel provided by the historical lane level traffic information and the recent lane level traffic information as a percentage of the speed of travel provided by the historical lane level traffic information.

15. An apparatus according to claim 11 wherein the computer program code instructions are further configured to, when executed by the at least one processor, cause the apparatus to cause a message to be provided to a driver or a vehicle indicative of the lane level traffic surprise.

16. An apparatus according to claim 11 wherein the computer program code instructions are further configured to, when executed by the at least one processor, cause the apparatus to cause information to be published regarding the lane level traffic surprise.

17. An apparatus according to claim 11 wherein the computer program code instructions are further configured to, when executed by the at least one processor, cause the apparatus to cause provision of the representation of the difference between representations of the speed of travel provided by the historical lane level traffic information and the recent lane level traffic information for use as a routing cost by a routing algorithm.

18. A computer program product according to claim 17 wherein the representation of the difference comprises a difference in the speed of travel provided by the historical lane level traffic information and the recent lane level traffic information as a percentage of the speed of travel provided by the historical lane level traffic information.

19. A computer program product for identifying a lane level traffic surprise, the computer program product comprising at least one non-transitory computer-readable storage medium having computer-executable program code instructions stored therein, the computer-executable program code instructions configured to:

receive historical lane level traffic information including a representation of a speed of travel along a respective lane of a link during each time epoch of a predefined time period;

receive recent lane level traffic information including a representation of a speed of travel along the respective lane of the link during each time epoch of the predefined time period, wherein the recent lane level traffic information is indicative of more recent traffic conditions than traffic conditions represented by at least some of the historical lane level traffic information, wherein the recent lane level traffic information is based on probe data collected by one or more probes that are traveling within a current time epoch or have traveled within a sliding time window that extends back from a current time over a predefined period of time along the respective lane of the link, and wherein the probe data is associated with one or more respective identifiers that identify the one or more probes that provide the probe data and enable linking of instances of probe data into vehicle trajectories and probe traces while maintaining anonymity of one or more probe devices associated with the one or more probes that provide the probe data;

determine a representation of a difference between representations of the speed of travel provided by the historical lane level traffic information and the recent lane level traffic information for each time epoch; and identify the lane level traffic surprise based upon the representation of the difference.

20. A computer program product according to claim 19 wherein the representation of the difference comprises a difference in the speed of travel provided by the historical lane level traffic information and the recent lane level traffic information, and wherein the computer-executable program code instructions configured to identify the lane level traffic surprise comprise computer-executable program code instructions configured to identify the lane level traffic surprise in an instance in which the difference in the speed of travel satisfies a predefined threshold.

21. A computer program product according to claim 20 wherein the computer-executable program code instructions configured to identify the lane level traffic surprise further comprise computer-executable program code instructions configured to identity the lane level traffic surprise as a first type of lane level traffic surprise in an instance in which the speed of travel along the respective link provided by the historical lane level traffic information exceeds the speed of travel along the respective link provided by the recent lane level traffic information or as a second type of lane level traffic surprise in an instance in which the speed of travel along the respective link provided by the historical lane level traffic information is less than the speed of travel along the respective link provided by the recent lane level traffic information.

* * * * *

UNITED STATES PATENT AND TRADEMARK OFFICE
CERTIFICATE OF CORRECTION

| | |
|---|---|
| PATENT NO. | : 11,657,706 B2 |
| APPLICATION NO. | : 16/577564 |
| DATED | : May 23, 2023 |
| INVENTOR(S) | : James Fowe |

It is certified that error appears in the above-identified patent and that said Letters Patent is hereby corrected as shown below:

In the Claims

In Column 19, Line 7, Claim 18, delete "A computer program product" and insert -- An apparatus --, therefor.

Signed and Sealed this
Nineteenth Day of December, 2023

Katherine Kelly Vidal
*Director of the United States Patent and Trademark Office*